April 25, 1967      K. SCHROTER      3,315,988

ORIENTABLE CONDUIT CONNECTOR

Filed Sept. 13, 1965

Kurt Schröter
INVENTOR.

BY Ross & Mestern

United States Patent Office 3,315,988
Patented Apr. 25, 1967

3,315,988
ORIENTABLE CONDUIT CONNECTOR
Kurt Schroter, Lohmar, Siegburg, Rhineland, Germany, assignor to Jean Walterscheid KG, Lohmar, Siegburg, Rhineland, Germany, a corporation of Germany
Filed Sept. 13, 1965, Ser. No. 486,772
Claims priority, application Germany, Aug. 4, 1960, W 28,318
3 Claims. (Cl. 285—190)

This application is a continuation-in-part of my co-pending application Ser. No. 130,229, filed Aug. 3, 1961 now abandoned. My present invention relates to a coupling for connecting a fluid conduit, adapted to carry a liquid or gas under pressure, to a body having a channel with an internally threaded termination.

Such couplings are generally made in two parts, i.e. an inner tubular member matingly received in the threaded channel and an outer sleeve member connectable to a pipe, hose or similar fluid conduit, the inner member being connected with the body as a permanent fitting thereon whereas the outer member is removable to enable its replacement by some other sleeve member joined to a different conduit. It is also desirable, in such interchangeable connection, to permit selective orientation of the fitting in any direction, yet prior constructions of this type required relatively complex manipulations to insure that the coupling was sufficiently fluid tight after reassembly with every orientation; since the inner tubular member has only a single angular position in which it can be tightly fitted into its channel, separate tightening operations were necessary to clamp the two members together and to seal the inner member to its supporting body, as by a special counternut bearing upon a packing ring.

It is, therefore, the general object of my present invention to provide a coupling of this type which can be locked in place, with any desired angular orientation, and sealed in a single operation.

Another object of my invention is to provide a coupling so constructed which is of simple design, easy to manufacture and operate, and able to withstand the high fluid pressures generally employed with such fittings.

It is also an object of this invention to provide a coupling of this character which prevents any substantial escape of fluid during adjustment operations.

A further object of the invention is to provide an improved high-pressure conduit coupling having readily interchangeable and/or replaceable parts.

Still another object of the instant invention is to provide a coupling of the character described having improved means for sealing the coupling against leakage of a pressure fluid therefrom.

A more specific object of my present invention is to provide an improved coupling for fluid-pressure conduits wherein undesirable throttling of the fluid flowing therethrough is obviated.

In a coupling according to the invention, the inner or male member has a radial aperture communicating via its axial bore with the channel into which it is screwed, this aperture further registering with a radial passage in the surrounding female or sleeve member in a predetermined relative angular position of the two members within a limited range of relative axial displacement. A clamping element such as a headed bolt, threadedly engaging the inner member at its end opposite the one which is screwed into the channel of the supporting body, has a flange overlying one of two packing rings located at opposite ends of the sleeve; when this element is tightened against the sleeve, its flange exerts pressure upon the supporting body through the sleeve and the two packing rings to form a fluidtight shell around the inner member, with concurrent stressing of the threads at both ends of that member so that a tight fit is also produced between the inner member and its supporting body for additional sealing effect. The tensioning of the threads at the opposite end of the inner member, i.e. between the latter and the clamping element, insures that no fluid can emerge from that end eveen if the axial bore of the inner member is extended to receive the clamping element; in that case this element has the dual effect of solidifying the assembly and plugging the fluid channel.

A coupling of this description can be oriented in any radial direction (with reference to the channel axis of its supporting body) by jointly turning the two members through a desired angle with maintenance of their operative relative angular position, and—if necessary—after a preliminary loosening of the clamping element, whereupon this element is retightened until the sleeve bears again under the necessary pressure upon the supporting body through the interposed packing ring. As even a swiveling through 360° will separate the seal-forming sleeve and rings from the support surface by not more than one pitch of the thread by which the inner member engages this support, no throttling of the flow will occur as long as the radial aperture of the inner member and the corresponding passage of the sleeve remain in register within an axial range equal to this pitch.

The joint rotation of the two coaxial members may be brought about in some cases, i.e. where the lateral passage of the sleeve is accessible in the absence of a hose or other conduit subsequently connected thereto, by means of a rod or bar radially introduced through that passage into the aperture of the inner member aligned therewith; in other instances it will generally be more convenient to maintain the two members permanently keyed to each other by coacting formations, such as flattened inner and outer peripheral surfaces, which prevent their relative rotation.

The above and other objects, features and advantages of the instant invention will become more readily apparent from the following detailed description of an exemplary embodiment of the invention, reference being made to the accompanying drawing in which.

Figure 1:
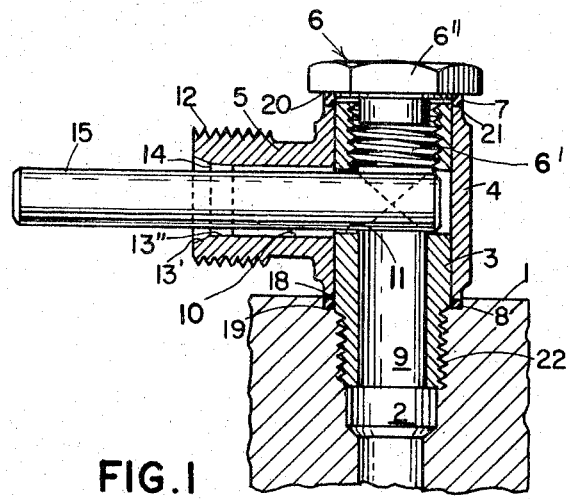
FIG. 1 is an axial cross-sectional view of a coupling according to the invention.

In the drawing I show a supporting body 1, which may be the housing of a fluid-pressure-operable device such as a pneumatic hammer, a hydraulic drill, or the like or a source of fluid under pressure (e.g. a compressed-air reservoir), formed with a threaded channel 2 adapted to receive the male-threaded extremity 22 of a central coupling member 3. The latter is provided with an axial bore 9 of substantially uniform cross-section throughout its length and communicates with a transverse or radial aperture 11 which is normally aligned with a passage 10 provided in an outer coupling member or sleeve 4 coaxially swingable on the inner tubular member 3. The outer coupling member 4 is formed with a radial neck 5 provided with a nipple for removably securing a fluid conduit to the neck 5. The sleeve 4 is also formed with an axial cavity dimensioned so that the sleeve may be urged axially onto the inner member 3 upon assembly of the coupling. The axial bore 9 is provided at its distal end with a female thread engageable with the male-threaded shank 6' of a clamping element 6 which also serves as a plug to block the distal or open end of the bore 9 remote from body 1.

Clamping element 6 is provided with a radial flange 6" having an annular sealing surface 20 extending transversely to the axis of the inner member 3 and overlying another annular sealing surface 21 on the outer coupling member 4. The latter is also formed with a further sealing surface 18 juxtaposed with the annularly grooved surface 19 of the body 1, sealing means in the form of preferably resilient packing rings 7 and 8 being respectively interposed between the sealing surfaces 20, 21 and 18, 19.

In order to facilitate the mounting of the coupling, the otherwise cylindrically tubular inner member 3 is externally flattened at diametrically opposite locations 17 to permit it to be threaded into an aperture 2 with the aid of a wrench. Thereafter, the sealing ring 8, the outer member 4 and the sealing ring 7 are sequentially slipped over the inner member 3 and the clamping element 6 is threaded into engagement with the latter. Prior to the tightening of the clamping element 6, the coaxial members 3 and 4 are jointly rotated into a desired angular position, e.g. with the aid of a rod or bar 15 thrust through the passage 10 and the aperture 11 (FIG. 1); it should be understood that, in this adjusted position, the thread 22 on the lower end of member 3 will not necessarily reach the bottom of the threaded termination of channel 2, in the manner shown in FIGS. 1 and 2, but that in most cases there will exist only an imperfect seal at this instant between body 1 and member 3. Next, the hexagonal head of 6" of clamping element 6 is engaged by a suitable wrench and rotated, with bar 15 held steady, in a tightening direction to exert downward pressure upon sleeve 4 and rings 7, 8 whereby the members 3, 4 undergo a slight relative axial shift insufficient to bring their respective radial openings 10, 11 out of register. This action completes a seal 6"–7–4–8–1 around the member 3, at the same time stressing the threads 22 and 6' with resultant retightening of the fitting between parts 3 and 1 as well as effective plugging of the upper end of bore 9; it will be noted, however, that even during the adjusting operation (i.e. prior to the tightening of element 6) the bore 9 remains substantially closed so that only a minor amount of leakage can occur at that stage, provided the passage 10 is also closed by a pipe connection, screw cap or other blocking means engaging the threaded nipple 12 of sleeve 4. When this is the case, bar 15 cannot be utilized to maintain the passage 10 and the conduit aperture 11 aligned. For this reason, members 3 and 4 advantageously are permanently keyed together by coacting flats 16 on the inner periphery of flats 17 on the outer periphery of inner member 3.

Figure 2:
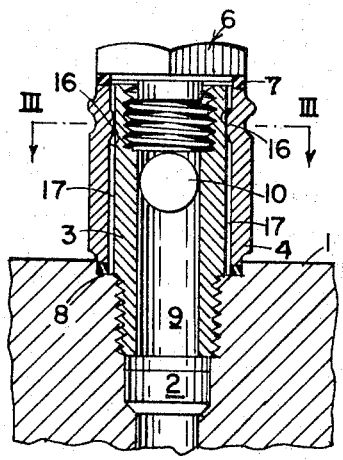
FIG. 2 is another axial cross-sectional view of the coupling taken along a plane perpendicular to the cross-sectional plane of FIG. 1.
Figure 3:
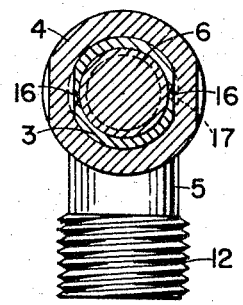
FIG. 3 is a cross-sectional view taken along line III—III of FIG. 2.
Figure 4:
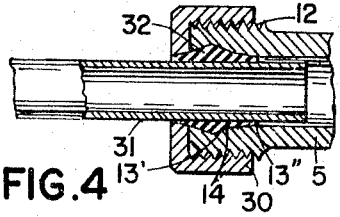
FIG. 4 is a detail view of a portion of the coupling of FIG. 1, illustrating the means for connecting a conduit to the coupling.

As illustrated in FIGS. 1 and 4, the threaded nipple 12 is engageable with a connecting nut 30 carried by a fluid conduit 31, a pair of outwardly diverging mutually intersecting conical internal compression surfaces 13' and 13" inside neck 5 being adapted to compact radially a plastically deformable packing ring 32, carried by the conduit 31, against the periphery of the latter as the ring is urged against these compression surfaces. The inwardly disposed compression surface 13" is tapered at a smaller angle than the outwardly positioned surface 13' so that the surfaces intersect along an annular cutting edge 14 which has been found to facilitate the deformation of the packing ring 32 and to establish a firm and fluidtight connection between the conduit 31 and the neck 5. The connecting nut 30 may also be provided with similar compression surfaces intersecting along a cutting edge as illustrated in FIG. 4. The aforedescribed connecting means prevents axial separation of the conduit 31 and the outer member 4 under the high fluid pressures generally employed.

As will be apparent from the drawing, the sum of the thicknesses of the two packing rings 7, 8 and the axial length of the outer sleeve member 4 must be greater than the extent to which the inner tubular member 3 protrudes beyond supporting body 1, throughout the range of operative angular positions of members 3, 4 with reference to that body, in order that the flange 6" of clamping element 6 may exert axial pressure upon the body 1 through the intermediary of sleeve 4 and rings 7, 8 to lock the sleeve in its selected angular position.

The invention as described and illustrated is believed to admit of many modifications and variations readily apparent to persons skilled in the art and intended to be included within the spirit and scope of the appended claims.

I claim:

1. A coupling for connecting a fluid conduit to a body having a channel with female connecting means, comprising:
   a generally tubular inner member having a bore extending axially inwardly from one end thereof, said inner member being provided with male connecting means at said one end coacting with said female connecting means to permit relative rotary motion between said inner member and said body with, at most, limited relative axial displacement in a range of operative positions thereof;
   an outer sleeve member coaxially surrounding said inner member with freedom of relative axial displacement, said inner member having a single radial aperture communicating with said bore and having substantially the same diameter as the latter, said outer member being provided with a radial passage of substantially said diameter connectable to said conduit and substantially registering with said aperture in a predetermined relative angular position of said members within said limited range of operative positions, said members being in fluidtight surface contact with each other around said aperture and said passage;
   first and second packing rings adjoining opposite ends of said outer member and surrounding said inner member;
   a clamping element threadedly engaging said inner member at the other end thereof, said clamping element having a flange overlying one of said packing rings, the sum of the thicknesses of said packing rings and the axial length of said outer member being greater than the axial extent by which said inner member protrudes beyond said body throughout said range of operative positions whereby said clamping element exerts axial pressure through said rings and said outer member on said body upon a threading of said one end into said termination with maintenance of said members to form a fluidtight assembly between said element, said outer member and said body in any said operative positions; and
   means for positively maintaining said members in said predetermined relative angular position upon a loosening of said clamping element to facilitate joint rotation of said members.

2. A coupling as defined in claim 1 wherein said bore extends through said other end of said inner member and is provided thereat with female threads engaged by said clamping element, the latter closing said bore at said other end.

3. A coupling as defined in claim 1 wherein the last-mentioned means comprises a pair of interengaging flat surfaces on said inner and outer members.

(References on following page)

References Cited by the Examiner

UNITED STATES PATENTS

| | | | |
|---|---|---|---|
| 2,220,216 | 11/1940 | Cloutier | 285—190 X |
| 2,307,328 | 1/1943 | Martin | 285—190 |
| 3,147,015 | 9/1964 | Hanback | 277—211 X |
| 3,219,366 | 11/1965 | Franck | 285—190 |

FOREIGN PATENTS

| | | |
|---|---|---|
| 453,125 | 3/1913 | France. |
| 1,308,499 | 9/1962 | France. |

CARL W. TOMLIN, *Primary Examiner.*

W. L. SHEDD, *Assistant Examiner.*